United States Patent [19]

Lindner et al.

[11] Patent Number: 5,075,380

[45] Date of Patent: Dec. 24, 1991

[54] SOFT, THERMO-PLASTICALLY PROCESSIBLE POLYMER ALLOYS CONTAINING POLYAMIDE

[75] Inventors: Christian Lindner, Colonge; Lothar Meier, Sprockhoevel; Otto Billinger, Linz; Karl-Erwin Piejko, Bergisch Gladbach, all of Fed. Rep. of Germany

[73] Assignee: Bayer Aktiengesellschaft, Leverkusen-Bayerwerk, Fed. Rep. of Germany

[21] Appl. No.: 566,859

[22] Filed: Aug. 10, 1990

Related U.S. Application Data

[63] Continuation of Ser. No. 283,538, Dec. 12, 1988, abandoned.

[30] Foreign Application Priority Data

Dec. 22, 1987 [DE] Fed. Rep. of Germany ....... 3743486

[51] Int. Cl.$^5$ .............................................. C08L 77/00
[52] U.S. Cl. ...................................... 525/183; 525/178
[58] Field of Search ............................................ 525/183

[56] References Cited

U.S. PATENT DOCUMENTS

| | | | |
|---|---|---|---|
| 4,174,358 | 11/1979 | Epstein | 525/183 |
| 4,474,927 | 10/1984 | Novak | 525/66 |
| 4,694,042 | 9/1987 | McKee | 525/183 |

FOREIGN PATENT DOCUMENTS 2063887  6/1981  United Kingdom ................ 525/183

*Primary Examiner*—Ana L. Carrillo
*Attorney, Agent, or Firm*—Connolly & Hutz

[57] ABSTRACT

This invention relates to soft, rubber-like, thermoplastically processible polymer alloys based on 10 to 50% by weight of (cyclo)aliphatic, thermoplastic polyamides and 90 to 50% by weight of special cross-linked, particulate alkyl acrylate copolymer rubbers suitable for the preparation of rubber-like, elastic moulding compounds.

The invention also relates to a process for their preparation.

7 Claims, No Drawings

SOFT, THERMO-PLASTICALLY PROCESSIBLE POLYMER ALLOYS CONTAINING POLYAMIDE

This application is a continuation of application Ser. No. 07/283,538, filed Dec. 12, 1988, now abandoned.

This invention relates to soft, rubber-like, thermoplastically processible polymer alloys based on 10 to 50% by weight of (cyclo)aliphatic thermoplastic polyamides and 90 to 50% by weight of specially cross-linked, particulate alkyl acrylate copolymer rubbers which are suitable for the preparation of rubber-like, elastic moulding compounds.

The invention also relates to a process for their preparation.

Flexible polymer mixtures based on certain graft polymers and acrylate copolymer rubbers are known and have proved valuable in the field of thermoplastically processible elastomers.

Polyamides, on the other hand, such as Polyamide-6 and Polyamide-66, are technologically important thermoplasts which are distinguished by their hardness, rigidity, high heat deflection temperature in use and high resistance to solvents.

It has now surprisingly been found that homogeneous, soft, flexible polymer alloys (polymer mixtures) can be obtained by the combination of preferably minor proportions of such polyamides and preferably major proportions of certain special cross-linked, particulate acrylate rubber copolymers in spite of the presence of the rigid non-elastic polyamide and in spite of the use of highly cross-linked acrylate copolymer rubbers. These polymer alloys have excellent thermoplastic processibility, good solvent resistance and high age resistance and in particular adhere firmly to other plastics materials, in particular to polyamides and polyurethanes.

This invention therefore relates to soft, thermoplastically processible polymer alloys with elastic properties, characterised by comprising a) from 10 to 50% by weight, preferably from 10 to 35% by weight of a thermoplastic, amorphous or partially crystalline polyamide preferably partially crystalline, aliphatic and/or cycloaliphatic polyamide, b) 90 to 50% by weight, preferably from 90 to 65% by weight of a partially cross-linked, particulate rubber copolymer obtained from b1) at least 60% by weight, preferably at least 65% by weight, in particular from 95 to 60% by weight based on b), of a $C_2$-$C_8$-alkylacrylate containing primary or secondary alkyl groups and b2) from 4.45 to 40% by weight, preferably from 10 to 35% by weight, in particular from 4.45 to 33% by weight, based on b), of at least one monomer from the series of acrylonitrile or $C_1$-$C_6$-alkylmethacrylates containing primary and/or secondary alkyl groups, b3) from 0 to 10% by weight, preferably from 0 to 6% by weight, in particular from 0.5 to 5% by weight of at least one monomer from the series of a tertiary alkyl(meth)acrylate, (meth)acrylic acid or maleic acid anhydride, and b4) from 0 to 5% by weight, preferably from 0 to 2% by weight, in particular from 0.05 to 2% by weight of a monomer which has a cross-linking action and contains at least two olefinically unsaturated groups, the rubber polymer b) having a gel content of from 20 to 99% by weight, preferably from 50 to 99% by weight, in particular from 70 to 99% by weight, and an average particle diameter ($d_{50}$) of from 0.09 to 1.2 μm, preferably from 0.09 to 0.8 μm and especially from 0.1 to 0.4 μm.

The polymer alloys may in addition contain conventional additives in the usual quantities.

The polyamides a) for the purpose of this invention may be amorphous or in particular partially crystalline. aliphatic and/or cycloaliphatic polyamides or mixtures thereof. Polyamide-6, polyamide-6,6 and copolymers of these two components are suitable partially crystalline polyamides for the polymer alloys according to the invention. There may also be used, for example, partially crystalline polyamides in which the acid components consist partly or completely of straight chained or branched aliphatic or cycloaliphatic dicarboxylic acids. e.g. adipic acid, suberic acid, sebacic acid and/or azelaic acid and/or cyclohexane dicarboxylic acid and the diamine component consists of straight chained or branched aliphatic or cycloaliphatic diamines, for example hexamethylene diamine and/or 2,2,4-trimethyl-hexamethylenediamine and/or 2,4,4-trimethyl-hexamethylenediamine and/or isophorone diamine. The methods of preparation and the compositions of such polyamides are known in the art. Polyamides which are prepared partly or completely from lactams containing 4 to 12 carbon atoms, optionally with the inclusion of one or more of the above mentioned diamine or dicarboxylic acid starting components, should also be mentioned.

Amorphous polyamides used may be the products of this type known in the art. They are obtained by the polycondensation of aliphatic and/or cycloaliphatic diamines such as 2- or 3-methyl-hexanediamine-(1,6), propylene diamine, hexamethylene diamine, decamethylene diamine, 2,2,4- and/or 2,4,4-trimethyl-hexamethylene diamine, bis-(4-aminocyclohexyl)-methane, bis-(4-aminocyclohexyl) -propane, 3,3'-dimethyl-4,4'-diaminodicyclohexylmethane, 3-aminomethyl-3,5,5-trimethyl-cyclohexylamine and its isomers (isophorone diamine), 2,5- and/or 2,6-bis-(aminomethyl)-norbornane and/or 1,4-dimethylcyclohexane with aliphatic and/or cycloaliphatic dicarboxylic acids such as oxalic acid, adipic acid, methyladipic acid, azelaic acid, decane dicarboxylic acid, heptadecane dicarboxylic acid, so-called dimeric acids and 2,2,4-and/or 2,4,4-trimethyladipic acid.

Copolymers obtained from the polycondensation of several monomers may, of course, also be used, as may copolymers which have been prepared with the addition of aminocarboxylic acids such as ε-aminocaproic acid ω-aminoundecanoic acid or ω-aminolauric acid or their lactams.

Polyamide-6, Polyamide-66, Polyamide-11 and Polyamide-12 are particularly preferred polyamides based on lactams or aminocarboxylic acids, and among these, Polyamide-12 and Polyamide-6 are especially preferred.

Polymers b) for the purpose of this invention are partially cross-linked, particulate rubber copolymers of b1) the above-mentioned quantities of a primary or secondary $C_2$-$C_8$-alkylacrylate such as ethyl, propyl, n-butyl, isobutyl or n-hexylacrylate, b2) the above mentioned quantities of at least one monomer from the series of acrylonitrile and $C_1$-$C_6$-alkylmethacrylate, acrylate, in particular methylmethacrylate but preferably acrylonitrile, and b3) the above mentioned quantities of a tertiary alkyl(meth)acrylate, in particular tertiary butyl acrylate, (meth)acrylic acid or maleic acid anhydride, and b4) optionally the given quantities of a diunsaturated or more highly unsaturated compound as cross-linking monomer.

The preferred cross-linking monomers b4) are ethylene glycol dimethacrylate, diallylphthalate and heterocyclic compounds containing at least three copolymerisable, ethylenically unsaturated double bonds. Particularly preferred cross-linking monomers are the cyclic monomers, triallylcyanurate, triallylisocyanurate, trivinylcyanurate, tris-acryloylhexahydros-triazine and the triallylbenzenes.

The quantity of cross-linking monomers is in particular from 0.05 to 2% by weight, based on the rubber copolymer b). In the case of cyclic cross-linking monomers containing at least three ethylenically unsaturated double bonds, it is advantageous not to use more than 1% by weight, based on the rubber copolymer.

The rubber copolymers b) have gel contents of from 20 to 99% by weight and small average particle diameters ($d_{50}$), preferably from 0.09 to 0.8 μm.

The preparation of component b) may be carried out in a known manner, for example by radical, aqueous emulsion polymerisation in the presence of anionic, surface active substances, in particular in the temperature range of from 40 to 95° C., preferably from 55 to 80° C. If no cross-linking monomers b4) are used, the rubber copolymers may subsequently be cross-linked in a known manner, e.g. by a peroxide treatment or by means of radiation.

In the preferred polymer alloys according to the invention, component a) consists of Polyamide-6, Polyamide-12, Polyamide.11 or Polyamide-66, preferably Polyamide-12, and the rubber-like copolymer component is an alkyl acrylate (b1) and acrylonitrile (b2) prepared by cross-linking polymerisation with copolymerisation of a proportion of trifunctional allyl compounds (b4), in particular triallyl cyanurate. Polymer alloys of this type are highly cross-linked (with gel contents above 70% by weight, in particular above 85% by weight).

The polymer alloys may contain conventional additives of the type basically known in the art, such as slip agents or lubricants, pigments, antioxidants and any stabilizers, fillers or reinforcing fibres as well as polyamide plasticizers. Examples include plasticizers from the series of sulphonamides, bisphenols and halogenated aromatic compounds.

The preparation of the mixtures (alloys) may be carried out by conventional methods in which the polymer components b) which have been isolated from their emulsion by conventional coagulation processes and, for example, direct drying (spray drying) and have optionally been purified are mixed with the polyamide components a) and optionally other additional components and additives of the type mentioned above by means of known compounding apparatus such as kneaders, mixing screws or rollers at elevated temperatures.

The invention further relates to a process for the preparation of soft, thermoplastically processible polymer alloys having elastic properties by mixing two components by means of known compounding apparatus at elevated temperatures in the solvent-free molten form, characterised in that a) from 10 to 50% by weight, preferably from 10 to 35% by weight of a thermoplastic, amorphous or partially crystalline aliphatic or cycloaliphatic polyamide or copolyamide, preferably a partially crystalline aliphatic polyamide, in particular Polyamide-6, Polyamide-66, Polyamide-11 and/or Polyamide-12 are mixed with b) from 90 to 50% by weight, preferably from 90 to 65% by weight of a partially cross-linked, particulate rubber polymer obtained from b1) at least 60% by weight, preferably at least 65% by weight, in particular from 95 to 60% by weight, based on b), of a primary $C_2$-$C_8$-alkyl acrylate containing primary or secondary alkyl groups, b2) from 4.45 to 40% by weight, preferably from 10 to 35% by weight, in particular from 4.45 to 33% by weight, based on b), of at least one monomer selected from acrylonitrile and $C_1$-$C_6$-alkylmethacrylates containing primary and/or secondary alkyl groups, b3) from 0 to 10% by weight, preferably from 0 to 6% by weight, in particular from 0.5 to 5% by weight of at least one monomer from the series of a tertiary alkyl(meth)acrylate, (meth)acrylic acid or maleic acid anhydride, and b4) from 0 to 5% by weight, preferably from 0 to 2% by weight, in particular from 0.05 to 2% by weight of a monomer which has a cross-linking action and contains at least two olefinically unsaturated groups, the rubber polymer b) having a gel content of from 20 to 99% by weight, preferably from 55 to 99% by weight, in particular from 70 to 99% by weight and an average particle diameter (d50) of from 0.09 to 1.2 μm, preferably from 0.09 to 0.8 μm and especially from 0.1 to 0.4 μm.

Moulding compounds obtained from these polymer alloys according to the invention have many of the properties of conventional rubber polymers as well as the properties of thermoplastic elastomers. Their special combination of elongation, softness (flexibility) and strength should be particularly mentioned. Thus they combine high tensile strength, preferably >5 MPa, in particular ≧10 MPa, with high, largely reversible elongation, preferably >80%, in particular ≧100%, considerable tear propagation resistance, preferably >25 MPa, in particular ≧37 MPa, and considerable Shore hardness A/D, preferably >70/15, especially ≧80/25. These mechanical properties may be varied by varying the proportions of a) and b) and the cold strength can be particularly advantageously modified and improved (e.g. in comparison to plasticized PVC films).

Since component b) is a highly cross-linked copolymer, the moulding compounds prepared from the polymer alloy contain extremely low proportions of volatile or migrating impurities compared with those of known moulding compounds which have rubbery elastic properties, such as plasticized PVC or polyamide. The special resistance to technically relevant solvent systems and the high age resistance should be particularly mentioned. The polymer alloys are suitable for the production of coatings, sealing compounds, films, damping materials and rubber articles.

EXAMPLES

1) Polyamides a) put into the process 1.1) Polyamide-12 having a relative solution viscosity (in m-cresol at 0.5 g/100 ml at 25° C.) of 2.1 (Vestamid ®L 2122 P - Hüls AG, Marl)

1.2) Polyamide-12 having a relative solution viscosity (in m-cresol at 0.5 g/100 ml at 25° C.) of 1.63 (Vestamid ® WS)

1.3) Polyamide-6 having a relative solution viscosity of 3.1 (as 1% solution in m-cresol at 25° C.) (Durethan® B 31 F - BAYER AG, D-5090 Leverkusen)

2) Components b) put into the process 2.1 Rubber copolymer according to the invention A solution of 2.5 parts by weight of the sodium salt of $C_{14}$-$C_{18}$-alkylsulphonic acids in 750 parts by weight of water is introduced into a reactor. After the solution has been heated to 70° C., 70 parts by weight of monomer solution A) are added and polymerisation is initiated by the addition of a solution of 3.5 parts by weight of potassium peroxydisulphate in 50 parts by weight of water. The remainder of solution A) and solution B) are introduced at a uniform rate into the reactor at 70° C. over a period of 6 hours and polymerisation is completed in 4 hours. A latex having a polymer solids content of 37% by weight, an average particle diameter ($d_{50}$) of 0.18 μm and a gel content (in DMF) of 98% by weight is obtained.

Solution A:
1105 parts by weight of n-butylacrylate (b1)
7 parts by weight of triallylcyanurate (b4)
474 parts by weight of acrylonitrile (b2)

Solution B: 30 parts by weight of the sodium salt of $C_{14}$-$C_{18}$-alkyl sulphonic acids 1790 parts by weight of water 2.2 Rubber copolymer according to the invention A rubber copolymer is prepared from n-butylacrylate, acrylonitrile, triallylcyanurate and tert.-butyl acrylate by polymerising Solution A as described under 2.1:

Solution A:
1030 parts by weight of n-butylacrylate (b1)
7 parts by weight of triallylcyanurate (b4)
474 parts by weight of acrylonitrile (b2)
75 parts by weight of tert.butylacrylate (b3)

Solution B: as under 2.1

A latex having a polymer solids content of 37% by weight, an average particle diameter ($d_{50}$) of 0.16 μm and a gel content (in DMF) of 97% by weight is obtained.

2.3 Rubber polymer for comparison A solution of 5 parts by weight of the Na salt of $C_{14}$-$C_{18}$-alkylsulphonic acids in 1030 parts by weight of water is introduced into a reactor. After the solution has been heated to 70° C., 80 parts by weight of monomer solution A are added and polymerisation is initiated by the addition of a solution of 4 parts by weight of potassium peroxydisulphate in 100 parts by weight of water. The remainder of solution A) and solution B) are introduced into the reactor at a uniform rate at 70° C. over a period of 5 hours and polymerisation is completed within 4 hours. A latex having a polymer solids content of 30% by weight, an average particle diameter $d_{50}$) of 0.20 μm and a gel content (in DMF) of 95% by weight is obtained.

Solution A:
995 parts by weight-or n-butylacrylate (b1)
5 parts by weight of triallylcyanurate (b4)

Solution B: 25 parts by weight of the sodium salt of $C_{14}$-$C_{18}$-alkyl sulphonic acids
700 parts by weight of water.

For determination of the average particle diameter $d_{(50)}$, see W. Scholtan and H. Lange, Kolloid-Zeitschrift and Z. für Polymere, 250 (1972), pages 787-796.

To measure the gel content in DMF, the gel component was separated from 0.5% solutions in tetrahydrofuran at 25° C. by means of an ultracentrifuge and weighed after drying (see M. Hoffmann et al, Polymeranalytik, Georg Thieme-Verlag, Stuttgart, 1977, pages 172, 289 - Part A and page 341 Part B.

3) Preparation and properties of the polymer alloys

The latices 2) are first stabilized with 1% by weight (based on the polymer content) of phenolic antioxidants and then coagulated with aqueous magnesium sulphate solution, washed and dried at 70° C.

Components a) and b) are compounded on a roller at 230° C. for 5 minutes to form polymer alloys 3.1 to 3.5 (see Table 1), 2.8% by weight of ester wax (Hoechstwachs®-C, Hoechst AG, Frankfurt-Hoechst, Federal Republic of Germany) being added as processing aid. The rolled sheet obtained is then compression moulded at 240° C. to produce test samples. A comparison of the properties is given in Table 2.

TABLE 1

Composition of the polymer compositions (in % by weight)

| Serial No. | Component a Type | | | Component b Type | | |
| --- | --- | --- | --- | --- | --- | --- |
| | 1.1 | 1.2 | 1.3 | 2.1 | 2.2 | 2.3 (Comparison) |
| 3.1 | 25 | | | 75 | | |
| 3.2 | 25 | | | | 75 | |
| 3.3 (Comparison) | 25 | | | | | 75 |
| 3.4 | | 25 | | 75 | | |
| 3.5 | | | 25 | 75 | | |

TABLE 2

Comparison of properties

| Serial No. | Tensile strength (MPa) | Elongation $\epsilon_R$ (%) | Tear propagation resistance (MPa) | Shore hardness A/D |
| --- | --- | --- | --- | --- |
| 3.1 | 10 | 211 | 36 | 82/28 |
| 3.2 | 11 | 220 | 40 | 83/31 |
| 3.3 | 0.8 | 22 | 4 | 42/0 (Comparison) |
| 3.4 | 10 | 190 | 37 | 80/25 |
| 3.5 | 11 | 100 | 42 | 84/30 |

Test Methods
Tensile strength according to DIN 53 455
Elongation according to DIN 53 455
Tear propagation resistance according to DIN 53 315
Shore hardness according to DIN 53 505

We claim:

1. A soft, thermoplastically processible polymer alloy with elastic properties, wherein the alloy comprises:
  a) from 10 to 50% by weight of a thermoplastic, partially crystalline aliphatic or cycloaliphatic polyamide;
  b) from 90 to 50% by weight of a partially cross-linked, particulate rubber copolymer, obtained by copolymerization in aqueous emulsion at 40-90° C. of:
    1) at least 60% by weight, based on b), of a $C_2$-$C_8$-alkylacrylate containing primary or secondary alkyl groups;
    2) from 4.45 to 40% by weight, based on b), of acrylonitrile;
    3) from 0 to 10% by weight, based on b), of at least one monomer selected from tertiary allkyl(-meth)-acrylate, (meth)acrylic acid and maleic acid anhydride; and
    4) from 0.05 to 2% by weight, based on b), of a monomer which contains at least two olefinically unsaturated groups and has a cross-linking action, the rubber polymer b) having a gel content, as measured in dimethylformamide, of from 50 to 99% by weight, and an average particle diameter ($d_{50}$) of from 0.09 to 0.8 μm.

2. A soft, thermoplastic processible polymer alloy as claimed in claim 1, wherein component b)1) is present in the amount of 95 to 60% by weight, based on b); component b)2) is present in the amount of from 4.45 to 33% by weight, based on b); component b)3) is present in the amount of from 0.5 to 5% by weight, based on b), and wherein the rubber polymer b) has a gel content, as measured in dimethylformamide, of from 70 to 99% by weight, and an average particle diameter ($d_{50}$) of from 0.1 to 0.4 μm.

3. A soft, thermoplastic processible polymer alloy as claimed in claim 2, wherein the cross-linking monomer b)4) is selected from a monomer having two olefinically unsaturated groups in an amount between 0.05 and 2.0% by weight or a monomer having three olefinically unsaturated groups in an amount between 0.05 and 1.0% by weight.

4. A soft, thermoplastic processible polymer alloy as claimed in claim 3, wherein component b)2) comprises from 4.45 to 33% by weight, based on b), of acrylonitrile; and wherein the monomer b)4) comprises from 0.05 to 1% by weight, based on b), and contains three olefinically unsaturated groups.

5. A soft, thermoplastically processible polymer alloy as claimed in claim 1, comprising
 a) from 10 to 50% by weight, of a thermoplastic, partially crystalline aliphatic polyamide, selected from polyamide-6, polyamide-66, polyamide-11, and polyamide-12;
 b) from 90 to 50% by weight of a partially cross-linked, particulate rubber copolymer obtained by copolymerization in aqueous emulsion at 40–90° C. of a mixture of monomers selected from
  1) at least 60% by weight, based on b), of a n-butylacrylate;
  2) from 4.45 to 40% by weight, based on b), of acrylonitrile;
  3) from 0 to 10% by weight, based on b) of tertiary butylacrylate; and
  4) from 0 to 1% by weight, based on b), of triallylcyanurate the rubber polymer b) having a gel content, as measured in dimethylformamide, of from 70 to 99% by weight, and an average particle diameter ($d_{50}$) of from 0.09 to 0.04 μm.

6. A process for the preparation of soft, thermoplastically processible polymer alloys with elastic properties as claimed in claim 1, comprising mixing two components a) and b) at elevated temperatures in the melt, wherein
 a) comprises from 10 to 50% by weight of a thermoplastic aliphatic polyamide; and wherein
 b) comprises from 90 to 50% by weight of a partially cross-linked, particulate rubber copolymer obtained by copolymerization in aqueous emulsion at 40–90° C.
  1) at least 60% by weight, based on b), of a $C_2$-$C_8$-alkylacrylate containing primary or secondary alkyl groups;
  2) from 4.45 to 40 by weight, based on b), of acrylonitrile,
  3) from 0 to 10% by weight, based on b), of at least one monomer selected from tertiary alkyl(meth)acrylate, (meth)acrylic acid and maleic acid anhydride, and
  4) from 0.05 to 2% by weight, based on b), of a monomer which has a cross-linking action and contains at least two olefinically unsaturated groups, and wherein the rubber polymer b) employed in the process has a gel content, as measured in dimethylformamide, of from 50 to 99% by weight, and an average particle diameter ($d_{50}$) of from 0.09 to 0.8 μm.

7. A process for the preparation of soft, thermoplastically processible polymer alloys as claimed in claim 6, wherein the polyamide a) is selected from polyamide 6, polyamide 66, polyamide 11 and polyamide 12; b)2) consists of acrylonitrile; b)3) consists of tertiary butylacrylate; and b)4) consists of 0.05 to 1% by weight of triallylcyanurate; and wherein the rubber polymer b) employed in the process has a gel content, as measured in dimethylformamide, of from 70 to 99% by weight, and an average particle diameter ($d_{50}$) of from 0.09 to 0.4 μm.

* * * * *